United States Patent
Wu

(10) Patent No.: US 11,131,367 B2
(45) Date of Patent: Sep. 28, 2021

(54) CHAIN TENSIONING DEVICE

(71) Applicant: KMC CHAIN INDUSTRIAL CO., LTD., Tainan (TW)

(72) Inventor: Daniel Wu, Tainan (TW)

(73) Assignee: KMC CHAIN INDUSTRIAL CO., LTD., Tainan (TW)

( * ) Notice: Subject to any disclaimer, the term of this patent is extended or adjusted under 35 U.S.C. 154(b) by 365 days.

(21) Appl. No.: 16/207,008

(22) Filed: Nov. 30, 2018

(65) Prior Publication Data
US 2019/0170225 A1    Jun. 6, 2019

(30) Foreign Application Priority Data

Dec. 4, 2017    (TW) .................................. 106142422

(51) Int. Cl.
*F16H 7/12* (2006.01)
*B62M 9/16* (2006.01)
*F16H 7/08* (2006.01)

(52) U.S. Cl.
CPC ............. *F16H 7/1281* (2013.01); *B62M 9/16* (2013.01); *F16H 7/12* (2013.01); *F16H 7/08* (2013.01); *F16H 2007/0804* (2013.01); *F16H 2007/087* (2013.01); *F16H 2007/0842* (2013.01); *F16H 2007/0865* (2013.01); *F16H 2007/0893* (2013.01); *F16H 2007/0897* (2013.01)

(58) Field of Classification Search
CPC ........................ B62M 9/16; F16H 2007/0893; F16H 7/1281; F16H 2007/0804; F16H 2007/081
USPC ................................................. 474/133, 135
See application file for complete search history.

(56) References Cited

U.S. PATENT DOCUMENTS

| | | | | |
|---|---|---|---|---|
| 667,594 A | * | 2/1901 | Soucy, Jr. .............. | B62K 3/005 280/261 |
| 1,513,473 A | * | 10/1924 | Frankackerman .... | F16H 7/1281 474/135 |
| 2,549,038 A | * | 4/1951 | Zenner ................... | G11B 25/08 242/352.4 |
| 3,121,575 A | * | 2/1964 | Bourgi ..................... | B62M 9/16 280/236 |

(Continued)

FOREIGN PATENT DOCUMENTS

| BE | 411156 A | 10/1935 |
|---|---|---|
| FR | 795071 A | 3/1936 |

OTHER PUBLICATIONS

The Search Report issued to European counterpart application No. 18209850.9 by the EPO dated Mar. 28, 2019.

*Primary Examiner* — Henry Y Liu
(74) *Attorney, Agent, or Firm* — DLA Piper LLP (US)

(57) ABSTRACT

A chain tensioning device is adapted to be coupled to a vehicle body and to be adjacent to a chain, and includes a connecting segment, a metallic resilient segment, a fixing member and a guiding member. The connecting segment includes a securing portion adapted to be coupled to the vehicle body and an extending portion adapted to be under the chain. The resilient segment is connected to the extending portion of the connecting segment via the fixing member, and has a spring constant which ranges from 0.01 to 1000 N/mm, and a Young's modulus which ranges from 69 to 220 megapascals. The guiding member is connected to the resilient segment and is biased by the resilient segment for maintaining a tension of the chain.

8 Claims, 4 Drawing Sheets

(56) References Cited

U.S. PATENT DOCUMENTS

| | | | |
|---|---|---|---|
| 3,834,246 A * | 9/1974 | McGilp | F16H 7/1281 474/135 |
| 4,036,069 A * | 7/1977 | Clark | B62M 9/16 474/135 |
| 4,069,719 A * | 1/1978 | Cancilla | B62M 9/16 474/134 |
| 4,525,152 A * | 6/1985 | Speer | F16H 7/1245 267/140.4 |
| 4,861,321 A * | 8/1989 | Siegwart, Jr. | B62M 9/16 474/133 |
| 4,908,006 A * | 3/1990 | Burysek | D01H 1/241 474/117 |
| 5,176,580 A * | 1/1993 | Stamm | F16F 9/306 474/101 |
| 5,221,236 A * | 6/1993 | Raymer | B62M 9/16 474/109 |
| 5,470,278 A * | 11/1995 | Chen | B62M 9/16 474/133 |
| 5,524,725 A * | 6/1996 | Schantzen | F16H 7/08 180/182 |
| 5,984,814 A * | 11/1999 | Davenport | B62M 9/08 474/50 |
| 6,033,330 A * | 3/2000 | Wong | F16F 15/022 474/133 |
| 6,189,639 B1 * | 2/2001 | Fuse | B62M 9/00 180/231 |
| 6,896,632 B2 * | 5/2005 | Redmond | F16H 7/1281 101/117 |
| 7,678,000 B2 * | 3/2010 | Harnetiaux | F16H 7/1281 474/117 |
| 7,892,125 B2 * | 2/2011 | Nelson | F16H 7/1254 474/134 |
| 7,955,205 B2 * | 6/2011 | Urabe | B62M 9/16 474/80 |
| 8,267,820 B2 * | 9/2012 | Yamamoto | B62M 9/16 474/133 |
| 9,187,148 B2 * | 11/2015 | Jewell | B62M 9/16 |
| 2005/0176538 A1 * | 8/2005 | Morita | B62M 9/16 474/136 |
| 2005/0253356 A1 * | 11/2005 | Matsueda | B62K 25/32 280/260 |
| 2006/0240920 A1 * | 10/2006 | Urabe | B62M 9/126 474/80 |
| 2008/0070730 A1 * | 3/2008 | Nelson | F16H 7/1254 474/134 |
| 2010/0113200 A1 * | 5/2010 | Yamamoto | B62M 9/16 474/133 |
| 2010/0194182 A1 * | 8/2010 | Katz | B62K 25/30 301/109 |
| 2010/0234154 A1 * | 9/2010 | Klieber | B62M 9/16 474/80 |
| 2012/0252614 A1 * | 10/2012 | Yang | F16H 35/02 474/71 |
| 2012/0322594 A1 * | 12/2012 | Kitamura | B62M 9/16 474/110 |
| 2014/0135159 A1 * | 5/2014 | Yang | B62M 9/085 474/148 |
| 2014/0235388 A1 * | 8/2014 | Chang | F16H 7/14 474/135 |
| 2014/0319798 A1 * | 10/2014 | Jewell | F16H 7/06 280/261 |

* cited by examiner

CHAIN TENSIONING DEVICE

CROSS-REFERENCE TO RELATED APPLICATION

This application claims priority of Taiwanese Patent Application No. 106142422, filed on Dec. 4, 2017.

FIELD

The disclosure relates to a tensioning device, and more particularly to a chain tensioning device.

BACKGROUND

A conventional bicycle chain gets worn out after extensive usage, which causes the chain to become elongated and stretched out. Once elongated, the bicycle chain becomes misaligned against teeth of sprockets of the bicycle, and may even fall off therefrom. As such, a chain tensioning device is usually coupled to a bicycle to maintain a tension of the chain and to keep the sprockets and the chain well-meshed. Existing chain tensioning devices, such as those disclosed in Taiwanese Patent No. 1590980 and Taiwanese Utility Model Patent No. M369912, tend to have complicated designs, which become too heavy and inconvenient for practical uses. The necessity of having to readjust angle of the chain tensioning device for tightening or relieving the tension on the chain also becomes cumbersome.

SUMMARY

Therefore, an object of the disclosure is to provide a chain tensioning device that can alleviate the drawback of the prior art.

According to the disclosure, the chain tensioning device is adapted to be coupled to a vehicle body and to be adjacent to a section of a chain that extends in a front-rear direction. The chain tensioning device includes a connecting segment, a metallic resilient segment, a fixing member and a guiding member.

The connecting segment includes a securing portion that has a first end adapted to be coupled to the vehicle body, and an extending portion that extends from a second end of the securing portion, and that is adapted to be spaced apart from the section of the chain.

The metallic resilient segment includes a connecting portion that is connected to the extending portion of the connecting segment, is adapted to be spaced apart from the section of the chain in the top-bottom direction, and has a spring constant which ranges from 0.01 to 1000 N/mm, and a Young's modulus which ranges from 69 to 220 megapascals. A thickness of the resilient segment in the top-bottom direction is smaller than a width of the resilient segment in the left-right direction and a length of the resilient segment in the front-rear direction.

The fixing member connects the connecting portion of the resilient segment to the extending portion of the connecting segment.

The guiding member is connected to an end of the resilient segment that is distal from the connecting portion of the resilient segment, is adapted to be disposed between the resilient segment and the section of the chain, and is biased by the resilient segment for maintaining a tension of the chain.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
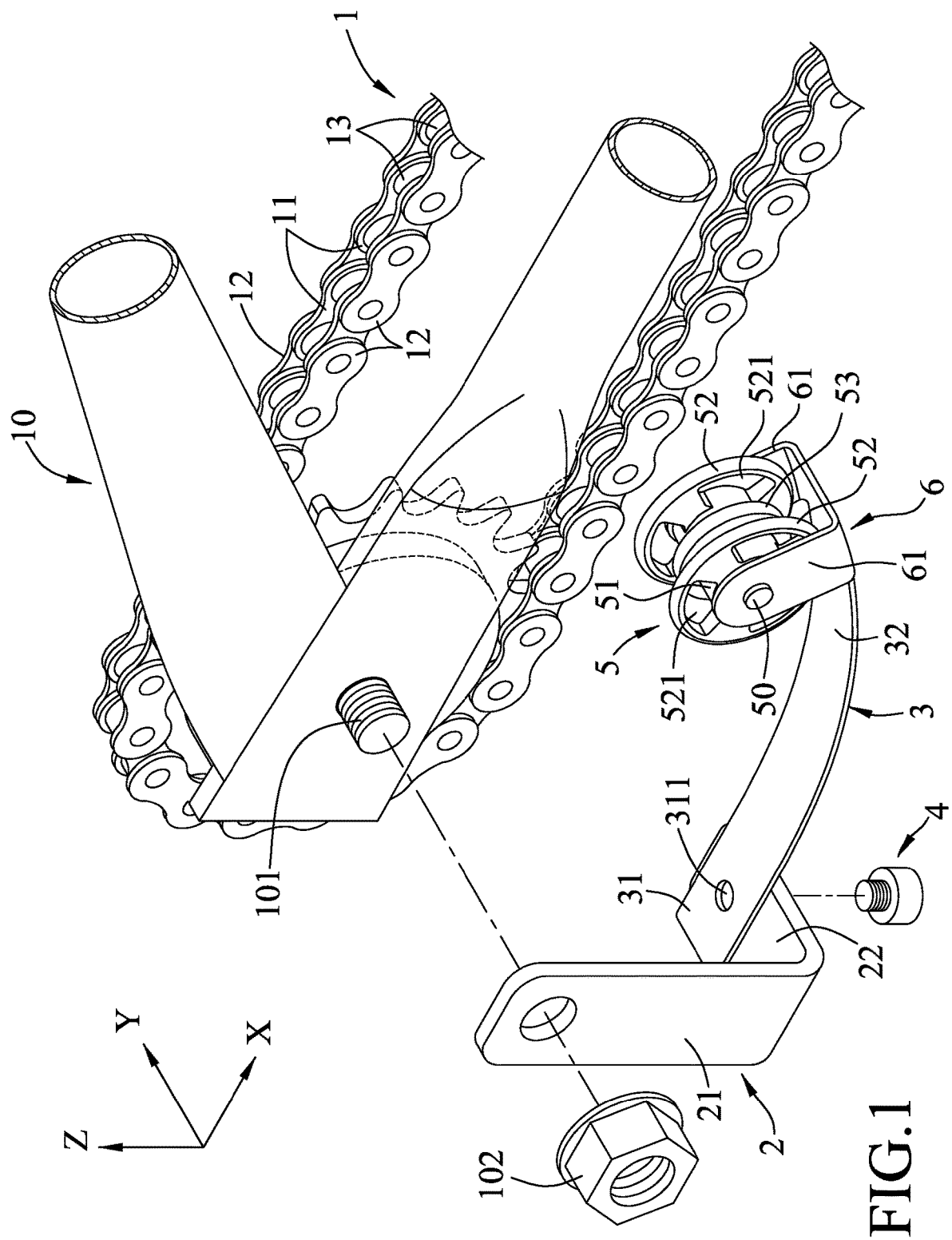
FIG. 1 is an exploded perspective view of a first embodiment of a chain tensioning device according to the disclosure alongside a vehicle body and a section of a chain.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
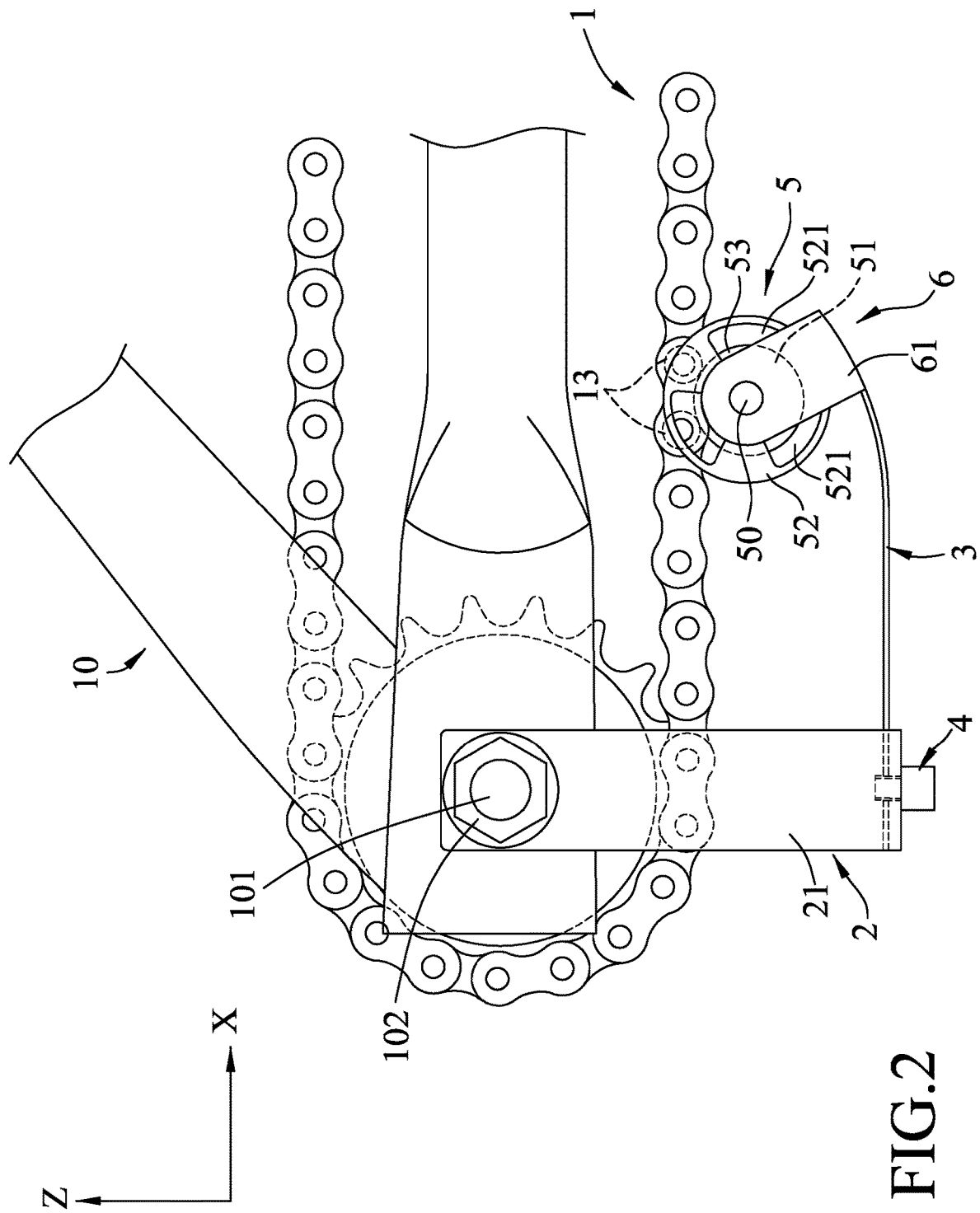
FIG. 2 is a side view of the first embodiment, illustrating an interconnecting relationship between the first embodiment, the vehicle body and the chain.

Referring to FIGS. 1 and 2, a first embodiment of a chain tensioning device according to the disclosure is adapted to be coupled to a vehicle body 10 and to be adjacent to a section of a chain 1 that extends in a front-rear direction (X). The chain 1 includes a plurality of inner chain plates 11, a plurality of outer chain plates 12, and a plurality of rollers 13 that are disposed between the inner chain plates 11. The chain tensioning device includes a connecting segment 2, a metallic resilient segment 3, a fixing member 4, a guiding member 5 and a coupling segment 6.

The connecting segment 2 is substantially L-shaped, is made of a metal material, and includes a securing portion 21 and an extending portion 22. The securing portion 21 extends in a top-bottom direction (Z) transverse to the front-rear direction (X), and has a first end adapted to be coupled to the vehicle body 10 via a bolt 101 and a nut 102, and a second end under the first end. The extending portion 22 extends in a left-right direction (Y), which is transverse to the front-rear direction (X) and the top-bottom direction (Z), from the second end of the securing portion 21, and is adapted to be spaced apart from the section of the chain 1.

The resilient segment 3 is flexible, is adapted to be spaced apart from the section of the chain 1 in the top-bottom direction (Z), and has a spring constant (k) which ranges from 0.01 to 1000 N/mm, and a Young's modulus which ranges from 69 to 220 megapascals. The resilient segment 3 includes a connecting portion 31 that extends in the front-rear direction (X) and that is connected to the extending portion 22 of the connecting segment 2, and a linking portion 32 that is slightly bent upward from the connecting portion 31 and that interconnects the connecting portion 31 and the coupling segment 6. The resilient segment 3 has a thickness in the top-bottom direction (Z) that is smaller than a width thereof in the left-right direction (Y) and a length thereof in the front-rear direction (X). In this embodiment, the connecting portion 31 has a connecting hole 311. As long as the connecting portion 31 can be connected to the extending portion 22 of the connecting segment 2, the contour of the connecting portion 31 may be varied in other embodiment.

The fixing member 4 extends through the connecting hole 311 to securely connect the connecting portion 31 of the resilient segment 3 to the extending portion 22 of the connecting segment 2.

The guiding member 5 is connected to the coupling segment 6 (i.e., the guiding member 5 is distal from the connecting portion 31 of the resilient segment 3), and is adapted to be disposed between the resilient segment 3 and an outer side of the section of the section of chain 1. In this embodiment, the coupling segment 6 includes two side walls 61 that are spaced apart in the left-right direction (Y). Each of the side walls 61 is disposed at a respective one of lateral sides of the guiding member 5 and interconnects the linking portion 32 of the resilient segment 3 and the guiding member 5. The guiding member 5 includes a coupling axle 50 connected transversely between the side walls 61, a central wheel portion 51 sleeved rotatably on the coupling axle 50, and a protruding portion 53 that protrudes radially outward from the central wheel portion 51. In this embodiment, the guiding member 5 further includes two side wheel portions 52, each of which is connected between a respective one of opposite lateral sides of the central wheel portion 51 and a respective one of the side walls 61. For the purpose of reducing overall weight of the chain tensioning device, each of the side wheel portions 52 has a plurality of weight-reducing holes 521, which remove unnecessary weight off the side wheel portions 52. The protruding portion 53 is adapted for abutting against the rollers 13 of the chain 1, and the side wheel portions 52 are adapted for confining the guiding member 5 to be aligned with the chain 1. In other embodiments, each side wheel portion 52 may have only one weight-reducing hole 521, and the guiding member 51 may simply have only one side wheel portion 52.

It should be noted that, the connecting segment 2 and the resilient segment 3 may be formed as a single piece made of a metal material, alleviating the need to be assembled by the fixing member 4. The resilient segment 3 and the coupling segment 6 may also be formed as a single metallic piece. With that in mind, all of the connecting segment 2, the resilient segment 3, and the coupling segment 6 may be formed as a single metallic piece as well.

The resilient segment 3 biases the protruding portion 53 of the guiding member 5 for abutting against the section of the chain 1 and for maintaining a tension of the chain 1, such that the chain 1 and a sprocket can remain well meshed for ensuring driving safety and for reducing chain wear. The design of the chain tensioning device in the disclosure is relatively simple, cost effective, and lightweight. The assembling of the chain tensioning device onto the vehicle body 10 is also relatively easy.

Figure 3:
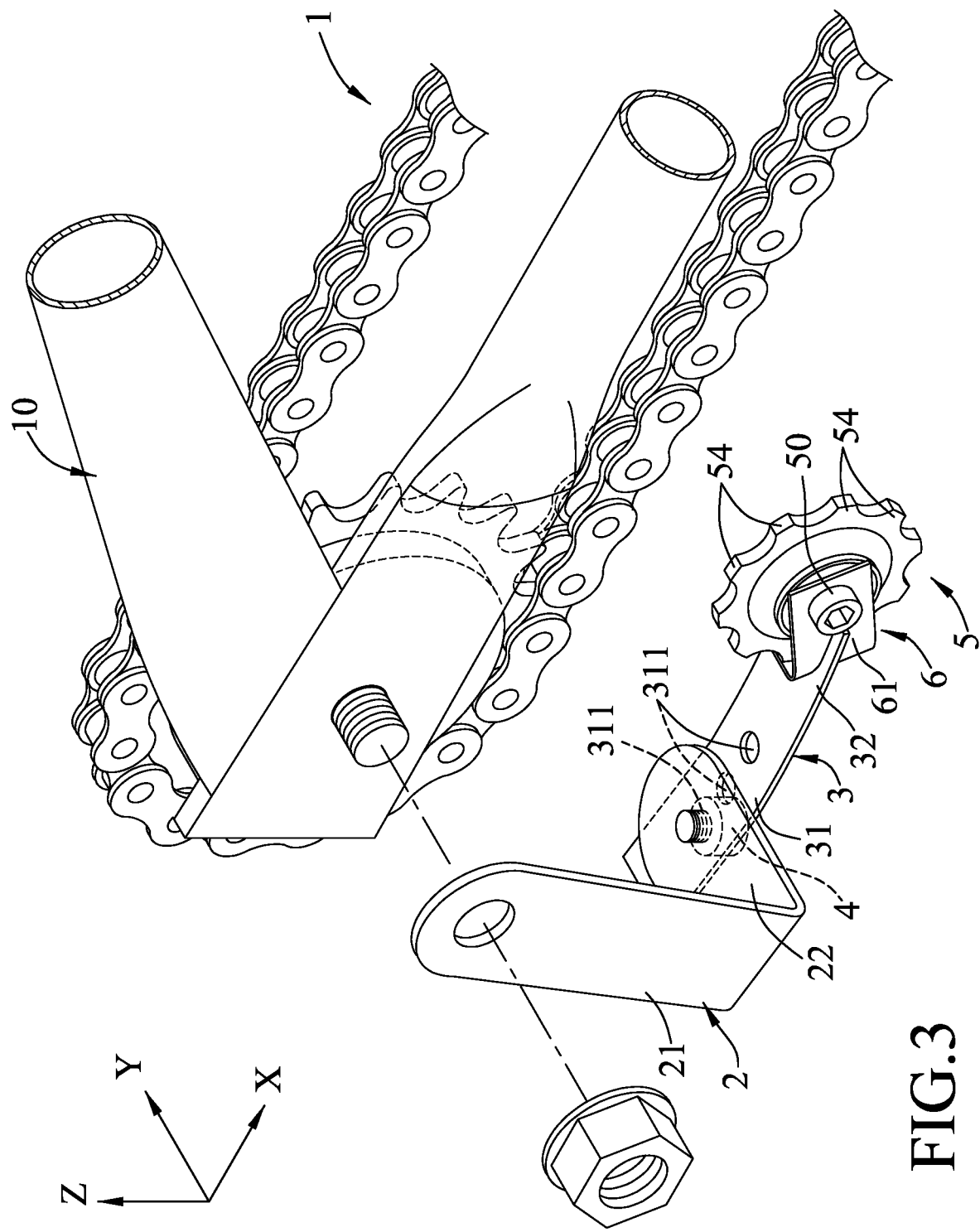
FIG. 3 is a partly exploded perspective view of a second embodiment of the chain tensioning device, alongside the vehicle body and the section of the chain.
Figure 4:
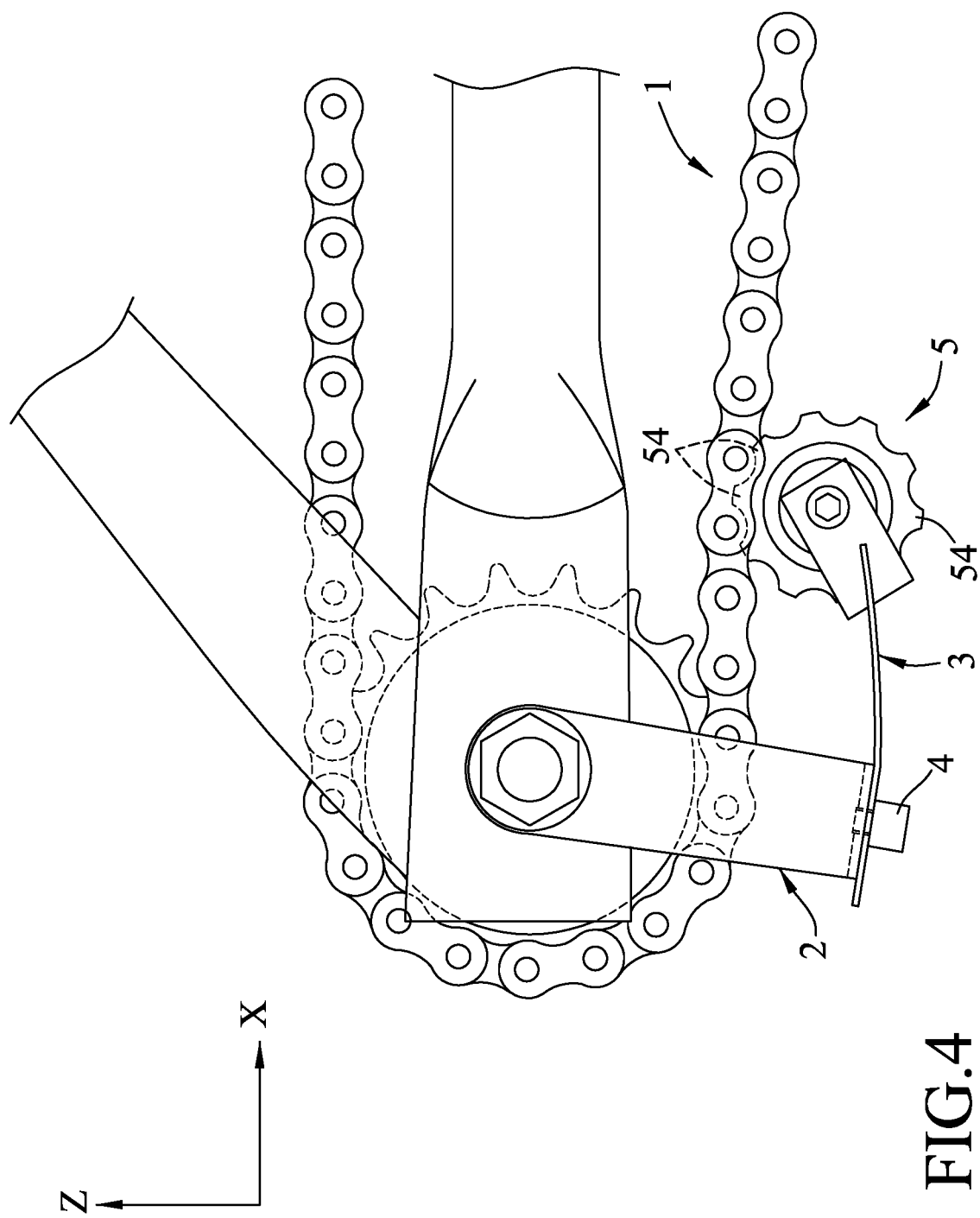
FIG. 4 is a side view of the second embodiment, illustrating an interconnecting relationship between the second embodiment, the vehicle body and the chain.

Referring to FIGS. 3 and 4, a second embodiment of the chain tensioning device is similar to that of the first embodiment, but with the following difference. In this embodiment, the connecting portion 31 of the resilient segment 3 has a plurality of connecting holes 311 that are spaced apart in the front-rear direction (X). As such, the fixing member 4 may selectively extend through one of the connecting holes 311 for connecting the connecting portion 31 of the resilient segment 3 to the extending portion 22 of the connecting segment 2, with the added benefit of adjusting a contact area between the guiding member 5 the chain 1 when the chain tensioning device is coupled to the vehicle body 10. In other embodiments, for the purpose of adjusting the contact area, the connecting portion 31 may also have one connecting hole 311 that is elongated in the front-rear direction (X), or the elongated connecting hole 311 may be formed in the extending portion 22 instead of the connecting portion 31.

In addition, in this embodiment, the guiding member 5 bears a form of a sprocket having a plurality of angularly spaced-apart teeth 54 that are adapted to be meshed with the chain 1.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A chain tensioning device adapted to be coupled to a vehicle body and to be adjacent to a section of a chain that extends in a front-rear direction, said chain tensioning device comprising:
   a connecting segment including
   a securing portion that extends in a top-bottom direction transverse to the front-rear direction, said securing portion having a first end and a second end opposite to the first end, the first end being adapted to be coupled to the vehicle body and spaced apart from the section of the chain in a left-right direction transverse to the front-rear direction and the top-bottom direction, and
   an extending portion that extends from the second end of said securing portion in the left-right direction, said extending portion being adapted to be spaced apart from the section of the chain in the top-bottom direction, said securing portion and said extending portion substantially forming an L shape;
   a metallic resilient segment including a connecting portion that has an upper surface and a lower surface opposite to each other in the top-bottom direction, said connecting portion further having at least one connecting hole each extending through said extending portion from the upper surface to the lower surface in the top-bottom direction, said connecting portion being connected to said extending portion of said connecting segment via one of the at least one connecting hole, being adapted to be spaced apart from the section of the chain in the top-bottom direction, and having a spring constant which ranges from 0.01 to 1000 N/mm, and a Young's modulus which ranges from 69 to 220 megapascals, a thickness of said resilient segment in the top-bottom direction being smaller than a width of said resilient segment in the left-right direction and a length of said resilient segment in the front-rear direction;

a fixing member extending through the one of the at least one connecting hole and connecting said connecting portion of said resilient segment to said extending portion of said connecting segment; and a guiding member connected to an end of said resilient segment that is distal from said connecting portion of said resilient segment, adapted to be disposed between said resilient segment and the section of the chain, and biased by said resilient segment for maintaining a tension of the chain.

2. The chain tensioning device as claimed in claim 1, wherein said connecting segment is made of a metal material.

3. The chain tensioning device as claimed in claim 1, further comprising a coupling segment that includes at least one side wall disposed at a lateral side of said guiding member and interconnecting said resilient segment and said guiding member.

4. The chain tensioning device as claimed in claim 1, wherein said guiding member is adapted to be disposed at an outer side of the section of the chain, and is biased by said resilient segment for abutting against the section of the chain.

5. The chain tensioning device as claimed in claim 1, wherein said guiding member has a central wheel portion, and a protruding portion that protrudes radially outward from said central wheel portion and that is adapted for abutting against the section of the chain.

6. The chain tensioning device as claimed in claim 5, wherein said protruding portion of said guiding member is adapted for abutting against rollers of the chain.

7. The chain tensioning device as claimed in claim 3, wherein said guiding member further has at least one side wheel portion connected between a lateral side of said central wheel portion and said at least one side wall of said coupling segment.

8. The chain tensioning device as claimed in claim 7, wherein said at least one side wheel portion has at least one weight-reducing hole.

\* \* \* \* \*